United States Patent [19]

Yang et al.

[11] Patent Number: 6,150,032
[45] Date of Patent: *Nov. 21, 2000

[54] ELECTROACTIVE POLYMER COATINGS FOR CORROSION CONTROL

[75] Inventors: Sze Cheng Yang, Wakefield; Robert J. Racicot, Narragansett; Robert L. Clark, Middletown; Huaibing Liu, Kingston; Richard Brown, Wakefield, all of R.I.; Mohd Norazmi Alias, Senawang, Malaysia

[73] Assignee: The Board of Governors for Higher Education, State of Rhode Island and Providence Plantations, Providence, R.I.

[ * ] Notice: This patent issued on a continued prosecution application filed under 37 CFR 1.53(d), and is subject to the twenty year patent term provisions of 35 U.S.C. 154(a)(2).

[21] Appl. No.: 08/502,215

[22] Filed: Jul. 13, 1995

[51] Int. Cl.[7] .............................. H01B 1/00; B32B 15/08; B32B 15/18; B32B 15/20

[52] U.S. Cl. ...................... 428/457; 428/458; 428/461; 428/463; 252/500; 528/422; 528/378

[58] Field of Search ................... 428/457, 423.1, 428/461, 458, 460, 463, 469; 252/500, 518–521, 519.2, 519.21, 519.3, 521.5; 528/373, 378, 391, 422, 487

[56] References Cited

U.S. PATENT DOCUMENTS

| | | | |
|---|---|---|---|
| 4,442,185 | 4/1984 | Skotheim | 429/111 |
| 4,731,408 | 3/1988 | Jasne | 524/458 |
| 4,933,106 | 6/1990 | Sakai et al. | 252/500 |
| 4,959,180 | 9/1990 | Armes et al. | 252/519 |
| 5,187,034 | 2/1993 | Otagawa et al. | 429/198 |
| 5,188,783 | 2/1993 | Pierce | 264/104 |
| 5,215,682 | 6/1993 | Destryken et al. | 252/519 |
| 5,253,100 | 10/1993 | Yang et al. | 359/266 |
| 5,312,681 | 5/1994 | Mays et al. | 428/323 |
| 5,370,825 | 12/1994 | Angelopoulos et al. | 252/500 |
| 5,382,382 | 1/1995 | Asakura et al. | 252/500 |
| 5,489,400 | 2/1996 | Lin et al. | 252/500 |
| 5,520,852 | 5/1996 | Ikkala et al. | 252/521 |
| 5,532,025 | 7/1996 | Kinlen et al. | 427/388.1 |
| 5,585,038 | 12/1996 | Kirmanen et al. | 252/500 |
| 5,585,040 | 12/1996 | Kirmanen et al. | 252/518 |

FOREIGN PATENT DOCUMENTS

| | | |
|---|---|---|
| 497514A | 8/1992 | European Pat. Off. . |
| 0560721 | 9/1993 | European Pat. Off. . |
| 2-160823 | 6/1990 | Japan . |

OTHER PUBLICATIONS

Ahlskog et al., "Heat–Induced transition to the conducting state . . . ", Synthetic Metals, vol. 69, Mar. 1, 1995, pp. 213–215.

Ghosh et al., "Swellability properties of polyelectrolyte complexes . . . ", Synthetic Metals, vol. 60, Sep. 15, 1993, pp. 133–135.

Liu et al., "Novel Template Guided Synthesis of Polyamiline", vol. 247 of Mat. Res. Soc. Symp. Proc., Jan. 1992, pp. 601–606.

Sun et al., "Template Guided Synthesis of Conducting Polymers—Molecular Complexes of Polyamilines and Polyelectrolytes", Polymer Reprints, Aug. 1992, pp. 378–380.

*Primary Examiner*—Deborah Jones
*Assistant Examiner*—Michael LaVilla
*Attorney, Agent, or Firm*—Samuels, Gauthier & Stevens

[57] ABSTRACT

An anti-corrosive polymeric complex which is comprised of a plurality of double-stranded molecular complexes. Each of the molecular complexes are comprised of a strand of a conductive polymer and a strand of a copolymer. The strands of the polymeric complex are non-covalently bonded to each other along the contour of the strands to form a side-by-side, twisted, double-stranded configuration.

4 Claims, 8 Drawing Sheets

ELECTROACTIVE POLYMER COATINGS FOR CORROSION CONTROL

FIELD OF THE INVENTION

The invention relates to double strand polymer complexes comprising a strand of a conductive polymer bound to a strand of a polymer having both ionic groups and non-ionic groups attached to the polymer chain.

BACKGROUND AND BRIEF SUMMARY OF THE INVENTION

The present invention embodies coatings for improving the corrosion of metals. The most common organic polymer paints used on metal are barriers to isolate the metal from an aggressive environment. These barrier type paints impede electron and ion transport in the metal and to some extent retard the permeation of water and oxygen into and from the metal. However, these coatings are not 100% effective in stopping corrosion.

Primer or Undercoats

The present invention in one embodiment comprises a coating which substantially improves the effectiveness of these paints. Furthermore, the prior art barrier paints are susceptible to scratch damage. The coating system of the present invention involves the use of electroactive polymers which are more resistant to scratch damage. The inventive coatings can be used as undercoat or primer coatings for metals, e.g. steel, used for automobile, aircraft, bridges, etc.

The anti-corrosion effect of polyaniline on stainless steel, has been known for about ten years, but its expansion into other metals has been slow. The prior art obstacles in the early studies originated from the difficulty in coating the polymer onto non-noble metals. Before the invention of soluble polyaniline, the only method available for depositing a film of polyaniline on metal was to electrochemically plate the aniline monomers from an acidic solution. The electrochemical synthesis is easily done on inert metals such as platinum and gold. With difficulty, it can be coated onto stainless steel. It is impossible to use cold-roll steel and aluminum as the metal electrode for this type of electrochemical coating process because of the severe chemical and electrochemical destruction of the metal surface under acidic electrolysis conditions. More recently, soluble or suspendable polyaniline was developed so that an electroactive polymer could be painted on a steel substrate to avoid the problem of electrochemical plating, *Novel Template Guided Synthesis of Polyaniline*, J. -M. Liu, L. Sun, J. -H. Hwang, and S. C. Yang, Materials Research Society Symposium Proceedings, 247, 601, (1992); and *Template-Guided Synthesis of Conducting Polymers, Molecular Complex of Polyaniline and Polyelectrolyte*, L. Sun, S. C. Yang, J. -M. Liu, American Chemical Society Polymer Preprints, 33, 379 (1992).

Aluminum Coatings

Pure aluminum naturally forms a passive layer of aluminum oxide which is protective against corrosion. However, pure aluminum metal does not have enough mechanical strength for applications which use aluminum as structural material. Improved strength is achieved in aluminum alloys that contains Cu, Mg, or Si. For example the alloy Al 7075-T6 contains 1.6% of Cu, 0.5% Si, 0.3% Mn, 2.5% Mg, 0.3% Cr, 5.6% Zn, 0.7% Fe and 0.2% Ti. This type of lightweight high strength aluminum is used in aircraft construction but does not have resistance to corrosion in ambient environments. The current technology for anti-corrosion for aluminum involves the use of chromates, *The Propeties of Passive Films on Metals*, J. B. Lumsden, p. 173, Corrosion Control by Coatings, Ed., I. H. Leidheiser, Jr., Science Press, Princeton, 1979. This is done either in the form of the chemical conversion of the aluminum surface in a chromate containing solution, *Anodic Coatings for Aluminum*, William C. Cochran and Donald O. Sprowls, p. 179, Corrosion Control by Coatings, Ed., I. H. Leidheiser, Jr., Science Press, Princeton, 1979; *Conversion Coatings-Chromate and Non-Chromate Types*, Nelson J. Newhard, Jr., p. 225 in Corrosion Control by Coatings, Ed. I. H. Leidheiser, Jr.r Science Press, Princeton, 1979, or by impregnating a coating with chromates, Corrosion-Inhibitive Sealants and Primers, Robert N. Miller, p. 325–338k in Corrosion Control by Coatings, Ed. I. H. Leidheiser, Jr., Science Press, Princeton, 1979.

Chromate based anticorrosion coatings have been important for protecting the lightweight and high-strength aluminum alloys against corrosion. It is currently the dominant anti-corrosion coating for aircraft. Unfortunately, there are significant environmental and health problems associated with chromates and an alternative coating needs to be developed.

The invention in another embodiment is directed to an electroactive polymer as an anti-corrosion coating for aluminum alloys. This polymer is a conductive (electroactive) polymer complexed with a polyelectrolyte and forms an anti-corrosion coating for aluminum.

In the present invention, electroactive polymers hereinafter referred to as double strand electroactive polymers (DSEP) are designed to protect an aluminum surface by a mechanism that is entirely different from that of the traditional polymeric paints. The traditional polymeric paints function as a barrier to ion transport between the metal and the environment and physically seal the surface without chemical reactions. In contrast, the DSEP interacts strongly with the metal surface to promote the formation of a protective passive layer. Therefore, the efficacy of the protection comes not from isolating the metal but by inducing the formation of a good passive layer on the metal. The DSEP coating works in a way more akin to that of anodization or chromate conversion than the traditional polymer barrier paints.

However, an additional property of the DSEP makes it quite distinct from the prior art chromate coatings. The DSEP is more tolerant to scratch damage than that of a chromate coating, i.e. chromate conversion and anodization, and the barrier paint coatings. In these coatings, corrosion starts from the scratch point and rapidly expends to undermine a large area of the coating. In contrast, the new DSEP coating of the invention is quite tolerant to scratch damage. Tests support that the DSEP appears to protect the scratched surface without repainting or a "touch up".

The ability to protect a scratched surface implies (1) tolerance to imperfection or pinholes during the initial coating or painting, and (2) tolerance to wear and scratching during usage. This translates into cost savings for the original equipment manufacturer (OEM) and a reduction of costs for repainting during the service life of the coated metal.

For an unscratched coating, the DSEP is as effective as that of a chromate coating and is better than the traditional barrier polymer paints. On a scratched coating, the DSEP will perform better than both the chromate coatings and the barrier paints.

Mechanistic studies suggest that the DSEP coatings can be effective in reducing pitting, corrosion and crevice formation. Pitting, corrosion and crevice formation are significant safety concerns because they weaken the aircraft structure without giving an alarming appearance. In principle, a self-repairing DSEP coating could be more elastic and less fragile than the traditional aluminum oxide passive film. One would expect it to better resist Stress-crack-corrosion than the traditional passive oxide layers. Reduced vulnerability to stress will also contribute to safety of aircrafts, automobiles and bridges.

In other cases, polyaniline can be painted on a surface as an undoped emeraldine based dissolved in NMP and then redoped by acid (unfortunately, the acid redoping causes problems with the aluminum substrate), *Solution Porcessale Conducting Polymer: Polyaniline-Polyelectrolyte Complex*, Linfeng Sun and Sze C. Yang, Mat. Res. Soc. Symp. Proc., 328, 167 (1994). However, these soluble polyanilines still have weakness when used as an anti-corrosion coating for aluminum.

Conventional polyaniline polymers have several weaknesses regarding their application as anti-corrosion coatings for aluminum, specifically: (1) difficulty in coating the polymers on non-noble metals, (2) material, thermal and chemical instability, (3) difficulty in adjusting the properties of the polymer to enhance the adhesion to metal and to topcoat material, and (3) not amenable to industrial manufacturing process.

Given the fact that the anti-corrosion property of conducting polymer was known for ten years, the advances appear to be slow in the basic mechanistic studies. The difficulty in mechanistic studies come from the fact that substantially all previous studies were done on electrolytically plated film on type 430 stainless steel samples, *The Properties of Passive Films on Metals*, J. B. Lumsden, p. 173, Corrosion Control by Coatings, Ed., I. H. Leidheiser, Jr., Science Press, Princeton, 1979; and *Anodic Coatings for Aluminum*, William C. Cochran and Donald 0. Sprowls, p. 179 in Corrosion Control by Coatings, Ed., I. H. Leidheser, Jr., Science Press, Princeton, 1979.

The chemistry of electrochemical polymerization of polyaniline dictates that the electroplating solution needs to be highly acidic (for example, 0.1 M $HClO_4$), and the applied potential must be highly anodic (1 V vs SCE). It is understandable there has been no study of this type of anti-corrosion for an aluminum substrate reported, because the test sample would be destroyed under these conditions. These conditions only allowed studies on carefully passivated stainless steel samples.

The DSEP complex disclosed herein can be formulated as a paint and applied to a metal surface without the damaging process conditions that the coated surfaces experience during the electrochemical synthesis of the coatings.

Conductive Polymers

The difficulties in using conventional conducting polymers for coatings are associated with two of their properties; (1) they are unstable in their doped state and (2) they lack processability. The reason for the lack of processability comes from the fact that the conducting polymers are π-conjugated polymers. The delocalized n electronic structure leads to a stiff polymer chain and strong inter-chain attraction. Thus, the conventional conducting polymers cannot be easily dissolved, melted or blended with other polymers.

The lack of material stability comes from the fact that the anionic dopants are easily lost or segregated *Conversion Coatings-Chromate and Non-Chromate Types*, Nelson J. Newhard, Jr., p. 225 in Corrosion Control by Coatings, Ed. I. H. Leidheiser, Jr., Science Press, Princeton, 1979. Dopants are lost due to heat, moisture, and rain water etc. Once the dopant is lost, the polymer loses its electrical conductivity and its electroactivity.

Because of the lack of processability, the prior art did not use conducting polymers as a paint-like coating but used the difficult electro-plating technique on a limited range of metals (such as 304 SS), but not aluminum. In any event, electrochemically plating organic polymers is a much less attractive technology for producing a coating as compared to painting or spraying the applications of active ingredients.

There have been recent developments to improve the processability of polyaniline so that one could avoid the troublesome electroplating process, Liu supra; and Sun supra, 1992 and 1994. These techniques did succeed in improving the ability to apply a conducting polymer onto a metal surface. However, they are still deficient in three aspects: (1) they are not stable enough for long term corrosion protection; (2) they do not meet the other physical demands, such as adhesion and blendability for a coating material; and (3) they are difficult to manufacture as a paint because of the need for redoping.

Recently, a German company (Zipperling Kessler, Hamburg, Germany) developed a formulation that incorporated a hydrochloric acid (HCl) doped polyaniline for an anti-corrosion coating, New Scientist, Oct. 29, 1994, page 24. A paintable formulation was made by mixing a fine powder of polyaniline with a lacquer, thus bypassing the problem of electroplating of the polymer film. Similar work is being done at NASA and at Los Alamos. Although this is an improvement, it has not solved the more fundamental problem of material stability. The dopant HCl in polyaniline is easily lost due to heat induced evaporation or by rain water wash out. This prior art material may be used in a special application for NASA's shuttle boosters because the shuttle's booster fumes help to replenish the lost dopant HCl. However, such conditions do not exist for normal aircraft applications.

There have been efforts to chemically modify the conducting polymer by attaching functional groups onto polyaniline. These efforts were not successful because the substituent group -R interferes with the conformation of the conducting polymer backbone and decreases its electronic conductivity.

Surfactant dopants have been used to render the polymer soluble. Although the polymer was soluble in organic solvents, it still suffered from the material instability problem of dopant loss.

The invention broadly comprises double strand electroactive polymers, the synthesis of the DSEPs, the coating formulations prepared with the DSEPs, the method of preparing and formulating the coatings, and the coatings per se.

The invention comprises a strand of a conducting polymer complexed to a polyelectrolyte. The polyelectrolyte suitable for use in this invention is selected from polymers with anionic functional groups such as carboxylic acid or sulfonic acid group or its salt form, as for example: poly(styrene sulfonic acid) or its salt form, poly(acrylic acid) or its salt form, poly(2-acrylamido-2-methyl-1-propenesulfonic acid) or its salt form, poly(butadiene-maleic acid) or its salt form, and poly(methyacrylic acid) and complexes thereof. The present conductive polymer is selected from the following polymers, such as polyaniline, polypyrrole, polythiophene, poly(phenylene sulfide), poly(p-phenylene), pbly (phenylene vinylene), poly(furylene vinylene), poly(carbazole), poly(thienylene vinylene), polyacetylene, poly(isothianaphthene) of the substituted versions thereof.

The polyelectrolyte comprises both "A" functional groups that balance the charge on the conducting polymer and which can also bond to the metal being coated; and "R" functional groups that modify the physical and chemical properties of the polymer. In a preferred embodiment the A functional groups are anionic functional groups, preferably carboxylates and sulfonates. The R functional groups in a preferred embodiment are used to increase adhesion to substrates, decrease swelling in a moisture environment, provide adhesion or binding to a topcoat, allow blending with other polymers and provide adjustment of glass transition temperatures. The R functional groups, in a preferred embodiment, are selected from the group consisting of methylacrylate, ethylacrylate, acrylamide, methylvinylether, ethylvinylether, H, $CH_3$ or $C_nH_{2n-1}$ where n=2–10.

DESCRIPTION OF THE PREFERRED EMBODIMENT(S)

Figure 1:
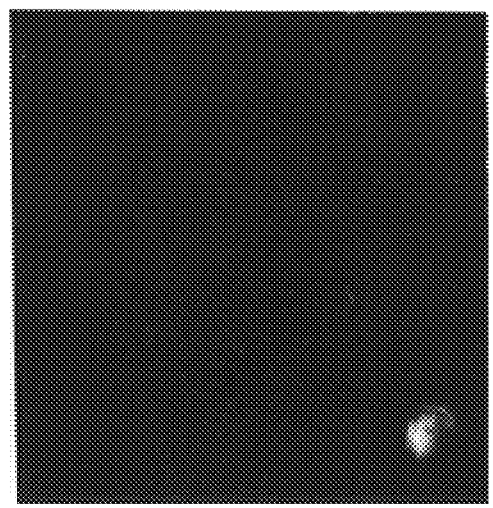
FIG. 1 is a photograph of Al 7075 coated with DSEP, picture taken after potentiodynamic tests in 0.5 N NaCl.

This invention involves an improvement over the prior art double strand conductive polymer previously developed at the University of Rhode Island. The present invention in a preferred embodiment involves the use of a copolymer or modified polyelectrolyte as the second strand of the double strand electroactive polymer. The DSEP is designed to be used as an anti-corrosion coating for aluminum alloys and as a primer for steel. A schematic of the molecular structure of this new material is shown below. It has the structure of a double strand polymeric complex between polyaniline and a modified polyelectrolyte. It was developed at S.C. Yang's laboratories at the University of Rhode Island. A template-guided synthetic method was used to synthesize a family of the molecular complexes. Substantial data has been collected to document that the molecular complex of polyaniline and the poly(acrylic acid) are arranged side-by-side as a twisted copolymer. The structure is analogous to the double-strand structure of DNA in which two strands of polymers are twisted together and substantial inter-strand binding leads to stability of the molecular complex.

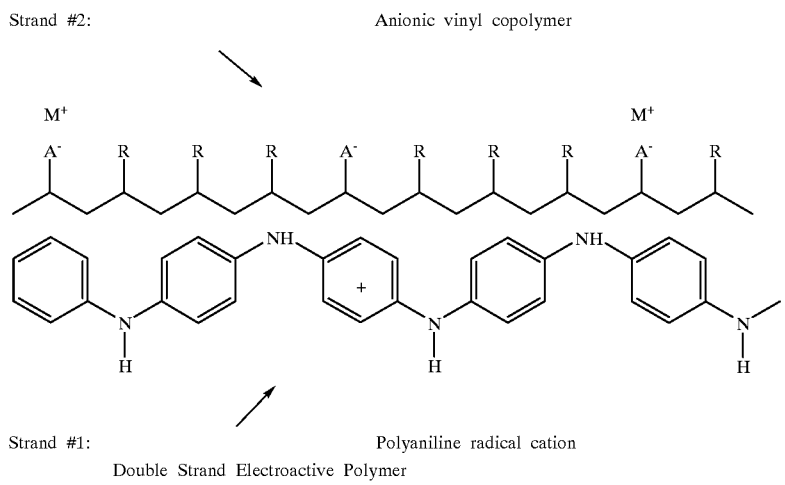

Double Strand Electroactive Polymer

The double-strand conducting polymer allows for structural designs that solve the problems with material stability and processability. The anionic functional groups (–A) were bonded to the second strand. The materials stability is improved because the polymeric dopant is strongly coupled with the polyaniline chain, thus, the dopants are not lost due to heat, water or solvent. It is stable in ambient environment. Some of the materials have been tested up to 290° C. and have been found to be thermally stable. No other conducting polymer has shown stability in the conductive form up to this temperature. The presence of the second strand also leads to ample opportunity to modify its structure by attaching appropriate functional groups (–R), thus we have an easily processable material. Molecular structure design allows the synthesis of soluble and melt processable polymer blends.

Several research groups have used the soluble single strand polymers to coat steel substrates and these coatings showed some anti-corrosion effect on steel. The same single strand polymer could not be used on aluminum surface because the acid redoping process necessary for some of these coatings will damage the underlying aluminum metal. These single strand polymers do not have the necessary molecular building blocks for optimizing the adhesion, the elasticity, and other requirements for a practical coating material. The single strand polymer can not fulfill the demands for coating applications while the double-strand polymers are a practical and efficient coating because of its ability to be structurally adjusted to meet the multiple demands on material properties.

In the preferred embodiment, the new double-strand polyaniline (DS-PAN) is a molecular complex of two linear polymers: Strand #1 is polyaniline. Strand #2 is a vinyl copolymer containing both ionic and non-ionic functional groups, e.g. A and R.

Polyaniline, in its electrically conductive form, is a radical cation. The delocalized charge, marked + in the structure, is mobile along the polymer chain and can transfer among the polymer chains to conduct electricity. These types of charge carriers (called polarons in the literature) can be reversibly injected and removed (by injecting electrons) without destroying the integrity of the polymer backbone structure.

The injection of positive charge into the polymer is a charge transfer reaction or one kind of oxidation reaction. That the charge can be reversibly injected and removed implies that the polymer can be reversibly oxidized and reduced. Thus, polyaniline is an electroactive material that can reversibly exchange electrons with its environment. Their reversibility in redox reactions had been utilized in rechargeable batteries and in electrochromic devices. Our current test data shows that the novel anti-corrosion effects are due to the elctroactivity of polyaniline.

Although the electroactivity of polyaniline is an advantageous property for the novel anti-corrosion effect, it is not the only property required of an anti-corrosion coating. There are many other properties that are necessary for it to be used as a practical anti-corrosion coating. There is the processing aspect, it must be coated on the metal surface easily and adherently. There are material durability requirements, i.e., is it a stable material under heat, moisture and aggressive environment? If the electroactive polymer is to be used as an undercoat, it is important to have good adhesion to the top coat. If the formulation calls for blending with another polymer, the ectroactive polymer needs functional groups that promote miscibility or crosslinking with another polymer.

These multiple demands on material properties were recognized by previous researchers. They improved solubility by attaching functional groups to the polyaniline backbone, but the electronic and electroactive properties of polyaniline were degraded by chemical substitutions on polyaniline. It is not possible to attach many substituents onto polyaniline without disturbing its delocalized electronic structure. There have been efforts to modify the dopants. This approach partially relaxed the problem of processability (solubility) but the more fundamental problem of material stability was not solved.

We have developed a strategy to synthesize double strand electroactive polymers. The general structure of the double-strand polyaniline (DS-PAN) is shown above.

A DS-PAN has the following advantages: (1) the second strand carries many sites to attach functional groups A and R for meeting the requirements on material properties for coating applications; and (2) the second strand achieves the goal of material property adjustment without degrading the electronic and electroactive properties of polyaniline because it is bonded to polyaniline by non-covalent bonds.

Although the inter-strand bindings (van der Walls, electrostatic and hydrogen bonding) are weaker than the covalent bindings, their weakness is compensated for their abundance in number. The side-by-side arrangement of two strands (assured by the template-guided synthetic approach) provides many contact points between two strands to provide a large number of the weaker but longer-range bindings. We have previously tested the stabilities of DS-PAN and found it to be very stable against heat, moisture, solvent and UV radiation.

Our studies show that the anionic functional group $A^-$ can serve two advantageous purposes: (1) As dopants for polyaniline to balance the mobile positive charge on polyaniline and (these dopants are covalently bonded and thus not susceptible to dopant loss due to heat or wash out) (2) As binding groups to the passive layer on metal that contains $Al^{+3}$ ($M^+$) sites (the binding groups enhance the adhesion of the coating onto the metal substrate).

An example for the R groups on the second strand is that of an ester group ($R=COOCH_3$). Here, the vinyl copolymer is a poly(acrylic acid-co-methylacrylate). This type of DS-PAN can be used as a solvent based paint and is most convenient for preparing uniformly coated aluminum 7075-T6 samples. The test data described in the preceding sections are based on this type of coating.

Synthesis of the Double Strand Electroactive Polymer

In order to synthesize the polymeric complex shown and described above, we devised and carried out a synthetic strategy. The method involved using the second strand, the vinyl copolymer as a molecular template. The monomers (aniline) of the first strand were added to a solution that contained dissolved vinyl copolymer. By adjusting the solution conditions, the aniline monomers are adsorbed onto the linear chain of the vinyl copolymer (template) to form a template aniline adduct. The bonding forces between the template and the aniline monomers are electrostatic attractions (counter ion condensation) and hydrogen bonding. After proper manipulation of the template:aniline adduct, an oxidant is added into the solution to cause the adsorbed or bonded aniline monomers to polymerize. Because the polymerized aniline maps the contour of the template, the template and the polyaniline molecules form a molecular complex. The structure of the double-strand complex has been verified by a combination of compositional, structural and property-structure correlations.

We had previously reported that the tertiary structure of the template:aniline complex controls the morphology of the double-strand complex. For example, if the template:aniline adduct is made to assume an extended chain structure, the polymerized double strand complex is found to have fibrous morphology. If the template:aniline adduct is made to assume a compact coil structure, the polymerized complex is found to assume a globular morphology. This synthetic strategy was called a template guided synthesis because of the morphological and shape control of the polymeric complex formed by a control at the template:aniline adduct stage.

EXAMPLE I

In this example, we illustrate a molecular design for an electroactive anticorrosion coating on aluminum. The design consisted of using a paint formulation that promotes passivation, yet avoided the formation of loosely structured metal hydroxides. This particular example utilized DSEP that was soluble in ethylacetate. Specifically, Polyaniline:poly(acrylic acid-co-methylacrylate) in ethyl acrylate comprised a paint formulation. The formulation included 20% of the polymer by weight and may be in the range of 10–40%. When this paint formulation was painted onto an aluminum alloy 7075-T6, a passive layer of aluminum oxide was formed because the electroactive coating acted as an oxidizer that transform the metallic $A^0$ to its higher oxidation state $Al^{+3}$. Some of the oxidized aluminum combined with oxygen in the air to form an oxide layer and some of the oxidized aluminum attracted the negatively charged groups on the electroactive polymer to form metal:polymer complexes. The bonding in the latter case was likely to be similar to that in the aluminum centered molecular complex with chelating organic agents. An example of a low molecular weight counterpart of the molecular complex is that between $Al^{+3}$ and dicarboxylic acid as shown below.

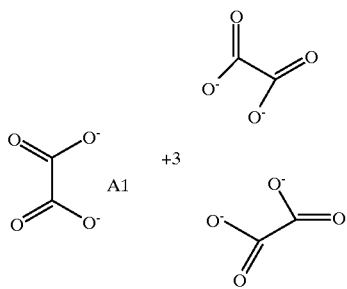

Other examples of the oxo complexes of aluminum have pyrocatechol and 8-quinolinol as the chelating agents. (W. A. Cotton and G. W. Wilkinson, Advanced Inorganic Chemistry, 3rd Ed., Wiley & Sons, N.Y., 1972, page 271).

The structural design of the PAN:Poly(AA-co-MA) was used as a paint. It was solubilized in ethyl acetate. Being soluble and paintable, it avoids the problems associated with electrochemical polymerization. Furthermore, the avoidance of using water as a solvent prevents the formation of hydrated aluminum oxide or aluminum hydroxide which are likely to be not as protective a passive layer as that of the dry aluminum oxide and the $Al^{+3}$/polymer complex formed in this paint formulation.

The first strand, polyaniline, is an electroactive polymer that has oxidation potential anodic to metals (such as iron, steel and aluminum). Thus, upon painting onto the metal surface, the electroactive polymer promotes an electron transfer from the metal surface to that of the polymer. Since the electroactive polymer is also an electronic conductor, (or semiconductor) the amount of charge transferred can be significant so that a significant number of electrons are transferred from the metal to the electroactive polymer. From a chemical point of view, the surface atoms of aluminum are at a higher oxidation state. Some of the aluminum atoms combine with oxygen to form oxides and some form the $Al^{+3}$/polymer complex. Both types of films are protective passive films that prevent corrosion of the metal. For application of paint by spraying or painting with a brush, the formulation works while the prior art aqueous soluble polyaniline:polyelectrolyte complex fails to protect the metal surface. For purpose of comparison, on an aluminum 7075-T6 substrate we applied a prior art polyaniline:poly(acrylic acid) complex dissolved in water or ethanol. The prior art material led to corrosion and pitting of the aluminum surface and was much less effective in protecting aluminum as shown in potentiodynamic tests.

The second strand, having the carboxylate functional groups, helps in providing strong adhesion of the coating to the metal substrate. First, the polar functional groups enhance adhesion to metal oxide surfaces. Secondly, the formation of $Al^{+3}$/polymer complex by electrostatic attraction (illustrated by the electrostatic attraction between $M^+$ and $A^-$) or ligand-metal complexation (similar to that shown previously) enhances the adhesion between the coating and metal substrate.

The existence of strong adhesion and the nature of the binding was supported in comparative tests. Two portions of the same ethyl acetate solution containing polyaniline:poly(acrylic acid-co-methylacrylate) were coated onto (1) a freshly polished aluminum 7075-T6 substrate, and (2) a clean glass slide. The coating can be applied by repeated dipping and drying or by placing a few drops of the solution onto a horizontally leveled surface of the substrate, or by painting with a brush. The coating thickness was about 1 micrometer. After the coating dried, both samples were subjected to adhesion tests by applying an adhesive tape (Scotch tape) on the surface and was then peeled off. The coating on the glass substrate was less adhered than that of the aluminum substrate. Furthermore, when both samples were immersed into a beaker of ethyl acetate, which was the solvent used to prepare the paint solution, the thin coating on aluminum could not be redissolved while the coating on glass immediately dissolved. This phenomenon is consistent with the doping for polymer/metal adhesion described previously.

Template-guided synthesis of double-strand polyaniline:poly (acrylic acid-co-methylacrylate).

Step I

The mole ratio between the carboxylic acid groups and the aniline monomer units ranged from 2:1 to 1:1. The resulting polymeric complex was soluble or dispersable in water, methanol and ethanol. The procedure for synthesis of polyaniline:poly(acrylic acid) complex has been reported by one of the joint inventors (S.C. Yang, supra) and the reported procedures were followed.

Step II

The polyaniline:poly(acrylic acid) complex prepared in step 1 was dissolved in methanol. To this solution is added catalytic amount of benzene sulfonic acid or toluene sulfonic acid to serve as a catalyst for esterification reaction. The solution was refluxed for 3 days. The esterification reaction converted some of the carboxylic acid group into the methyl acetate group. This lowered the solubility of the complex in methanol and the polymeric complex precipitated out of the solution. The precipitate was filtered out and dissolved in ethyl acetate. If a higher degree of esterification was desired, the precipitate could be redissolved in 1:1 mixture of ethylacetate and methanol, and the solution further refluxed until precipitate was again formed. This precipitate was soluble in pure ethyl acetate but is not soluble in 1:1 mixture of ethyl acetate and methanol. The reaction product was poly(acrylic acid-co-methylacrylate).

The coating can be done by repeated dipping and drying or by placing a few drops of the solution onto a horizontally leveled surface of the substrate or by painting with a brush. The coating thickness was about 1 micrometer.

TEST DATA EXAMPLE I

The new electroactive polymer was a double strand polyaniline:poly(acrylic acid-co-methylacrylate) (or, PAN:Poly(AA-co-MA). Test results of this new polymer coated on Al 7075-T6 substrates are discussed in this section.

The polymer was painted onto aluminum sample surface. PAN:Poly(AA-co-MA) was dissolved in organic solvents, e.g. ethylacetate, to give a homogeneous coating formulation. This solution was painted on 2"×2" aluminum 7075-T6 coupons for the tests. The final coating thickness was about 1 micrometer.

Figure 2:
FIG. 2 is a photograph of a control sample (uncoated) tested under the same conditions as the sample of FIG. 1 with the pitting corrosion visible.

FIGS. 1 and 2 show contrasts of coated and uncoated samples for their resistance to corrosion in an aggressive environment of 0.4 N NaCl solution. After two weeks of contact with the salt solution, the uncoated aluminum sample shows extensive pitting on the surface (FIG. 2), while the coated sample show no sign of corrosion (FIG. 1). This demonstrates that the electroactive polymer is effective for protecting aluminum from corrosion.

In these tests, we did not apply any topcoat so that the film of electroactive polymer was directly exposed to salt water. The electroactive polymer used in this test is permeable to water so it is different from the barrier type polymer paints. Thus, the mechanism for corrosion protection in this example cannot be the same as that of the traditional polymer coatings (such as the epoxy coatings) which serve as a barrier to water and salt. Although the coating in this test was swelled with water, it does not need to be swelled to be effective.

Figure 3:
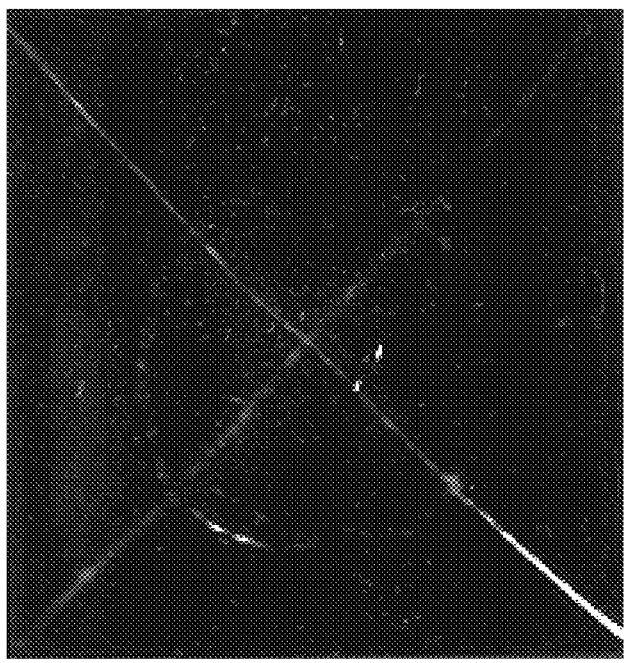
FIG. 3 is a photograph of the sample of FIG. 1 with scribed lines.

FIG. 3 shows that the electroactive coating is tolerant to scratch damage on the surface. A coated sample was first scribed with the edge of a razor blade and then immersed in 0.5 N NaCl solution for seven days. For comparison, an uncoated aluminum sample was immersed in the same solution without scratching the surface. After seven days, the scratched line in the sample of FIG. 3 remained shiny. In contrast, the uncoated aluminum sample showed significant pitting similar to that of FIG. 2 and the surface was covered by a thick gray colored layer of aluminum hydroxide deposit. The metal surface at the scribe line of FIG. 3 was protected while the uncoated metal surface in FIG. 2 was corroded.

Figure 4:
FIG. 4 is a SEM at 620X of the scratched area of the sample of FIG. 3.
Figure 5:
FIG. 5 is a SEN picture of an uncoated AL 7075 sample similar to that of FIG. 2 with magnification 720×.

FIG. 4 is an SEM picture showing a magnified view (620×) of the scribed area of the sample of FIG. 3 after 7 days of immersion in 0.5 N NaCl solution. The upper ⅘ of the picture is the scribed area. The lower ⅕ of the picture shows the electroactive polymer coating. The white flakes are fragments of polymer torn by the razor blade used to scribe the surface. The scratched surface is relatively smooth compared with that of the uncoated sample of FIG. 2 which underwent the same salt solution test. Referring to FIG. 5, the surface of a sample similar to FIG. 2 is rough after seven days of immersion in salt solution. This is consistent with the morphology of a surface covered with the product of corrosion.

Our initial mechanistic studies suggest that the electroactive polymer promotes the formation of a passive layer upon coating of the polymer onto the aluminum metal surface.

Figure 6:
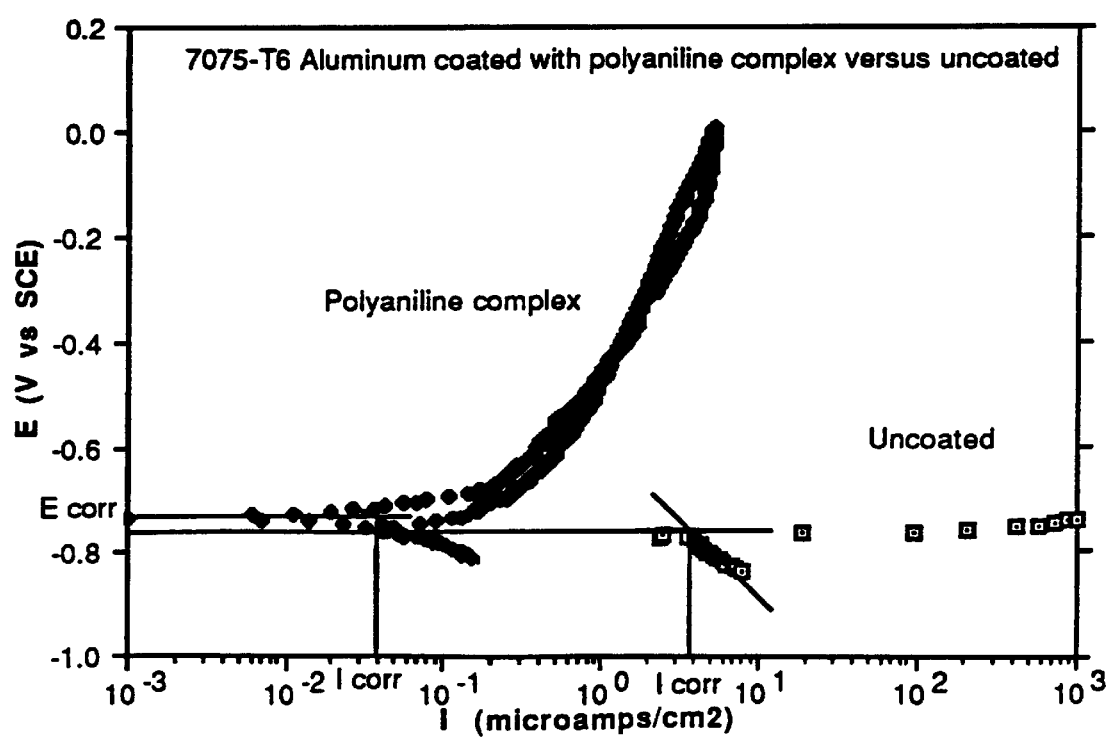
FIG. 6 is a graph of dynamic scans of coated and uncoated AL 7075 samples.

Referring to FIG. 6, two potentiodynamic scans show the signature of the passive film formation and the excellent protection against corrosion. The potential dynamic scans of the aluminum samples contrast the electrochemical behavior of the coated and uncoated aluminum samples in the test electrolyte of 0.5 N NaCl. Uncoated Al 7075-T6 is severely corroded (with current density exceeding 1000 $\mu A/cm^2$ and approaching a diffusion limited current) with only a very slight driving voltage (20 mV anodic to $E_{corr}$) In contrast, the current density of the coated sample is very low even with a driving voltage of 700 mV anodic to $E_{corr}$). The corrosion current for the coated sample is at least 100 times smaller than that of the uncoated sample. The sharply increased corrosion resistance showed by the polarization curve of the coated sample is consistent with the formation of a tight passive layer on the surface of the substrate.

Figure 7:
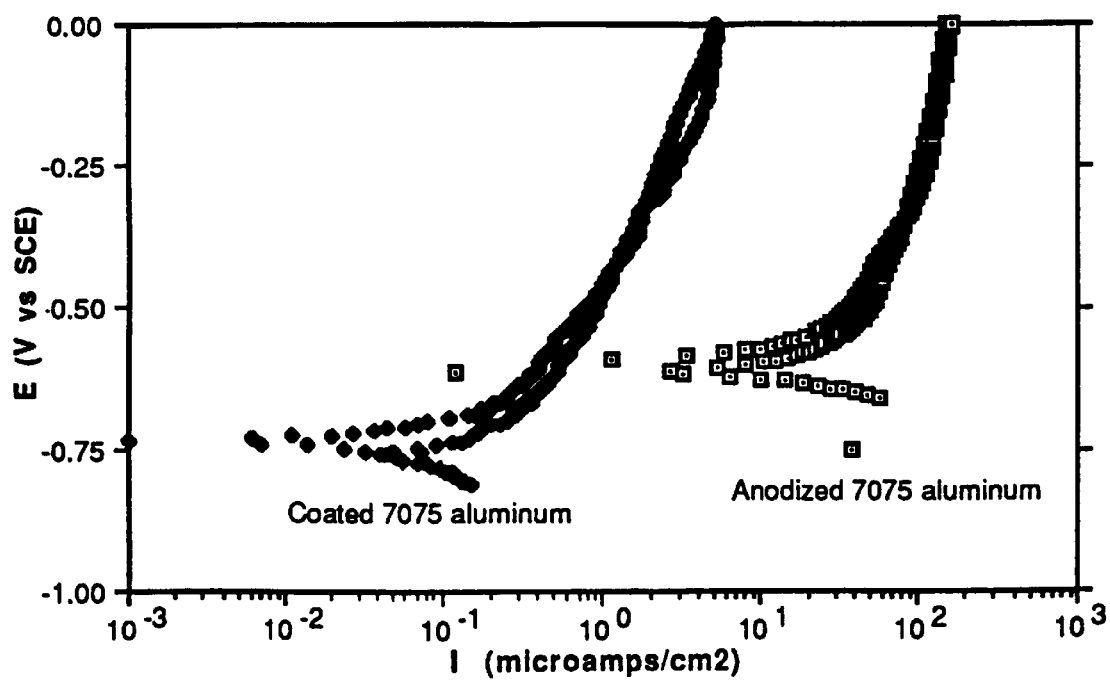
FIG. 7 is a graph of the comparison of the passivation induced by (1) DSEP; and (2) anodization and 1 N $H_2SO_4$.
Figure 8:
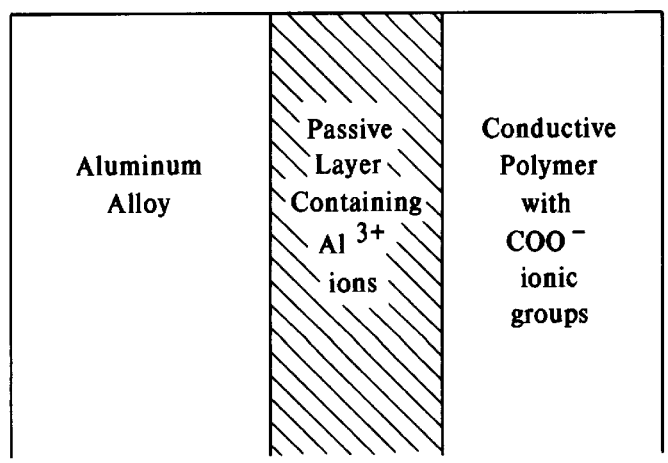
FIG. 8 is a schematic diagram of the proposed electrostatic locking mechanism for passive film formation.

Referring to FIG. 7, both potential dynamic curves show the characteristics of passive layer formation of coated aluminum and anodized aluminum, but the electroactive polymer coated sample shows much lower corrosion current than that of the anodized aluminum. It appears that the electroactive polymer promotes a protective layer of unusually high quality.

This electroactive polymer coating was applied to steel samples. After dipping the steel sample in the electroactive polymer solution of ethyl acetate, the surface of the steel turns to gray-black color indicating the formation of a passive layer. The sample was immersed in 0.5 N sodium chloride solution along with a control sample that is an uncoated steel sample. The uncoated sample showed rust formation within one day, while the coated sample showed patterns of green/blue color regions but without any sign of corrosion.

Discussion

Self-Discharge Induced Passivation

This is a mechanism suggested for a Conductive Polymer/Steel system, 2, to explain its ability to maintain passivation. We tested to determine if the corrosion protection of our Conductive Polymer/Aluminum also agree with this mechanism.

In this mechanism suggested by previous studies, the open circuit voltage of the conductive polymer is in the passive range of the substrate that is desired to be protected. When the coating and substrate are placed in solution the electrochemical system action is then the same as anodically polarizing the substrate into its passive region to provide protection. It would be expected that the coating would allow some damage tolerance in this mechanism as areas of substrate revealed by a scratch would be maintained at a potential in the passive region.

In the initial studies conducted for the double strand polymer (PAN:Poly(AA-co-MA) on Al 7075, it should be noted that in the 0.5 N NaCl environment for the uncoated alloy, there is no passive range for the conductive polymer to safely polarize the substrate (see the polarization curve for the uncoated sample in FIG. 6). The open circuit potential for the coated alloy (FIGS. 6 and 7) in 0.5 N NaCl was very close to the open circuit for the uncoated or bare alloy suggesting little polarization of the substrate by the coating. In addition the passive range for the conductive polymer coating on top of the aluminum alloy was well above the breakdown potential for the alloy.

Electrostatic Binding

During polarization of the double strand conductive polymer, deprotonation of the carboxylic group occurs resulting in a net negative charge in the conductive polymer. This must be balanced to maintain electroneutrality. One positive ion to balance the negative charge would be the $Al^{3+}$ ion from dissolution of the substrate. The carboxylic ions in the electroactive polymer (labeled as $A^-$) would bind the aluminum ions in the passive layer ($M^{+3}$ ions) in a fashion similar to the binding between multi-dentate polymer and a positively charged ion.

An electrostatic attraction between the opposite polarity ions would stabilize the passive layer and essentially block the metal ions from penetrating through the conductive polymer. The difficulty of the aluminum ions being dissolved in the solution is probably the reason for the formation of a tight and stable passive layer. The cyclic polarization data as shown in FIG. 6 shows a strong passive film over a wide range of potentials, from −750 to 0 volts (v.s. SCE). This would support the ion blocking mechanism as the low passive current would block the positive ion flow to maintain electroneutrality. Calculations using the passive current density indicate that the layer of bound positive ions would be around 4000 Å thick. This should be detectable by depth profiling XPS studies. The charge on the ion can be determined from binding energy. The form of the curves was identical but the current density was higher for the anodizing solution. In the anodized case the only mechanism available is the release of $Al^{3+}$ ions to form a strong oxide passive film.

A very important additional feature of the electrostatic bonding mechanism is the repulsion of like charges. The negative chloride ion is responsible for the localized corrosion damage of pitting in these alloys. The negatively charged conductive film will repulse these ions and effectively keep them away from the metal surface. The chloride ion therefore will not damage the metal.

Other empirical qualitative data in support of this mechanism includes the increase in adhesion noticed after exposure to a corrosive environment. This would be expected if an electrostatic bond between positive and negative ions formed during exposure.

Protection of the substrate from corrosion after a scratch through the coating to the substrate would also be predicted. The $Al^{3+}$ ions released in the scratched area will remain bound to the metal surface just to maintain overall electroneutrality with the conductive polymer. The protection of a scratch after immersion in 0.5 N NaCl for one week is shown in FIG. 4.

EXAMPLE II

In Example I we disclosed a method for synthesizing a double strand polymer (PAN:Poly(AA)) followed by chemical modification to adjust its hydrophobicity so that it was suitable for an anticorrosion coating. In this example, we disclose how the structural adjustment can be done by using a molecular template that already contains the desired functional groups (R) in a copolymer.

IIA

Electroactive Coating Material Poly(Acrylamide-co-acrylic acid; Polyaniline

1. Formation of template:(Aniline) adduct:

2.74g of poly(acrylamide-co-acrylic acid) (sodium salt, M.W. 200,000, 70% carboxyl, Polysciences) which contains 0.022 mole carboxyl group was treated with 25 ml 3 m HCl to completely convert the salt form to the acid form which was then separated as a precipitate from the solution. The supernant liquid was decanted and the precipitate was washed with distilled water three times to remove the small molecule electrolytes. The precipitate was then dissolved in 25 ml DMP and 1 ml aniline (0.011 mole) was added and stirred for 0.5 hr.

2. Polymerization of aniline in the template:(Aniline) adduct:

After 50 ml 3M HCl and 1 ml 3M $FeCl_3$ were added, 1.25 ml of 30% $H_2O_2$ (0.011 mole) was added dropwise. Within two minutes, the solution turned green. The reaction was completed in eight hours and a dark green solution was prepared. The product solution was miscible with DMF, DMSO and NMP.

A precipitate came out when the raw product solution was added to water. The fresh wet precipitate dissolves in DMF, but the dried one no longer dissolved in DMF. The dried precipitate is soluble in 0.1M NaOH.

IIB

Electroactive Polymer for Coatings Application Poly(ethylene Maleic Acid):Polyaniline 1. Formation of template:(Aniline) adduct:

1.4g of poly(ethylene-maleic anhydride) (0.022 mole —COOH) and 25 ml water was heated at 70° C. for five hours. When 1 ml An (0.011 mole) was added, a white gel was formed. 25 ml water was added to dissolve the white gel and stirred for three hours.

2. Polymerization of aniline in the template:(Aniline) adduct:

25 ml 3M HCl, 0.5 ml 3M $FeCl_3$ and 1.25 ml 30% $H_2O_2$ (0.011 mole) were added sequentially. After eight hours, a homogeneous dark green solution was made.

IIC

Electroactive Polymer for Coatings Application:Poly (Methyl Vinyl Ether-co-maleic Acid):Polyaniline 1. Formation of template:(Aniline) adduct:

3.83 g of poly(methyl vinyl ether-co-maleic acid) dissolved in 100 ml distilled water (0.044 mole —COOH). 2 ml aniline (0.022 mole) was then added and then stirred for four hours.

2. Polymerization of aniline in the template:)Aniline) adduct:

100 ml 3M HCl, 1 ml 3M $FeCl_3$ and 2.50 ml 30% $H_2O_2$ (0.022 mole) were added sequentially. After eight hours a homogeneous dark green solution was made.

The above complexes with the ratio of An/—COOH=1 and 2 have been also synthesis. Both are suitable for coating applications.

EXAMPLE III

A Coating System:An Electroactive Polymer Undercoat and a Barrier Polymer Topcoat The electroactive polymers were used as an undercoat on aluminum and steel samples and an epoxy top coat was applied. This coating system is advantageous both for increased protection against corrosion and for the ease in choosing color and the glossy finish of a top coat.

The electroactive polymer coatings of Examples 1 and 2 can be used as the undercoat and a commercial epoxy top coat formulation containing organic solvent and titanium oxide pigments. After the topcoat was dried, the samples were subjected to potentiodynamic and Electrochemical Impedance Spectroscopy analysis for samples in contact with 0.5 N sodium chloride solution under the same condition.

Figure 9:
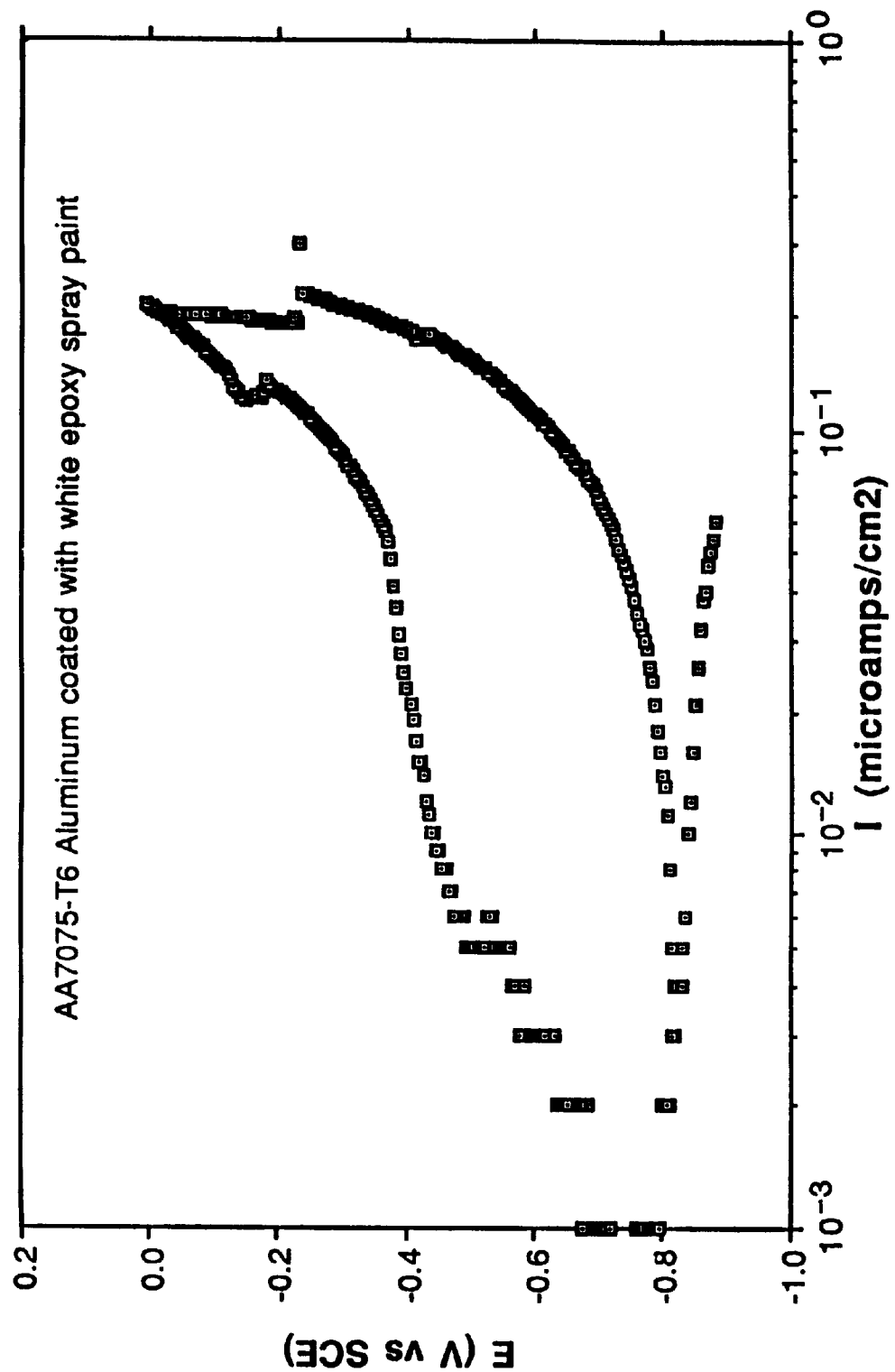
FIG. 9 is a potentiodynamic scan for epoxy coated Al 7075-T6.
Figure 10:
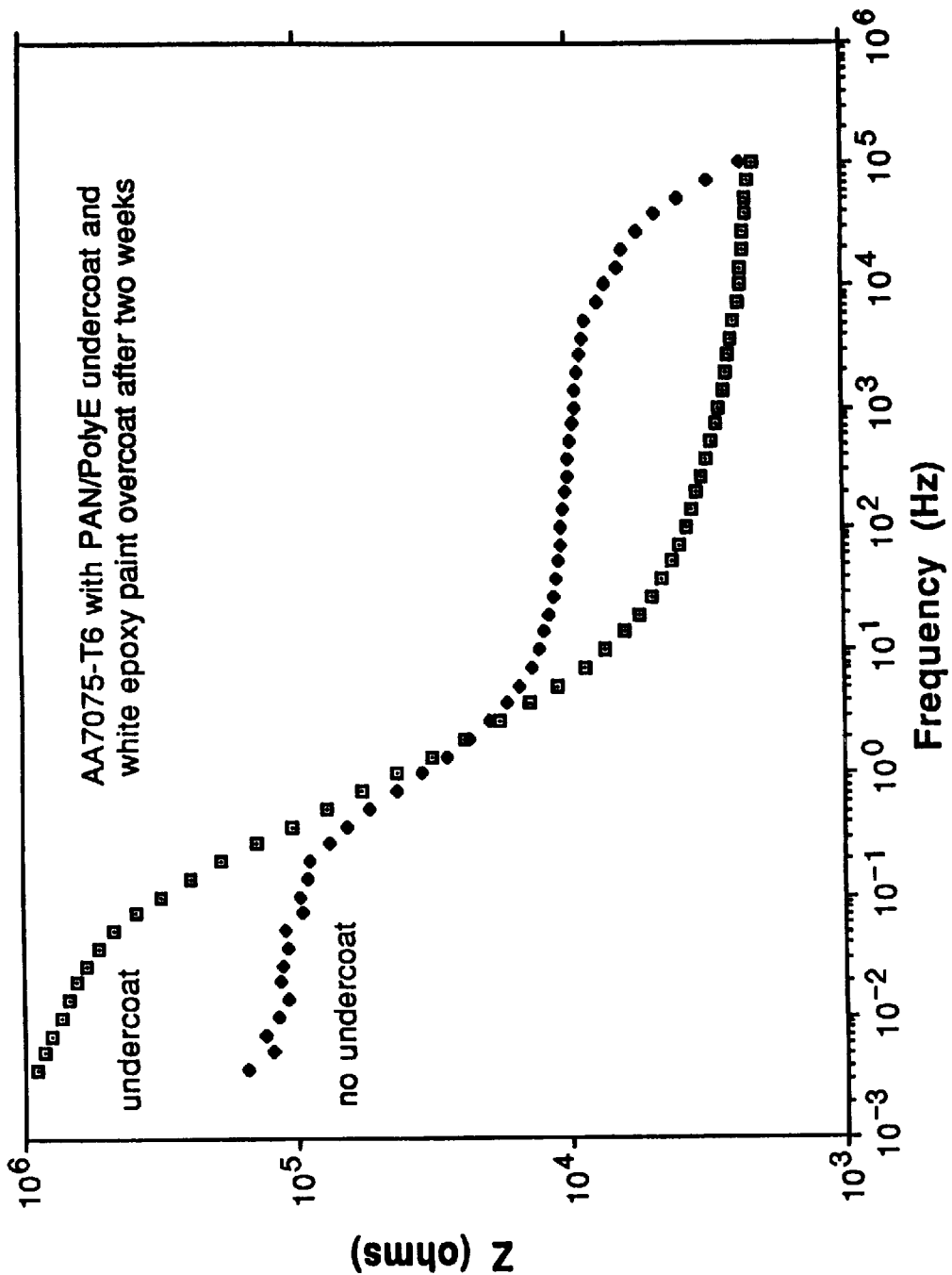
FIG. 10 is an electrochemical impedance spectroscopy scan of AL 7075-T6 with or without an undercoat of electroactive polymer.
Figure 11:
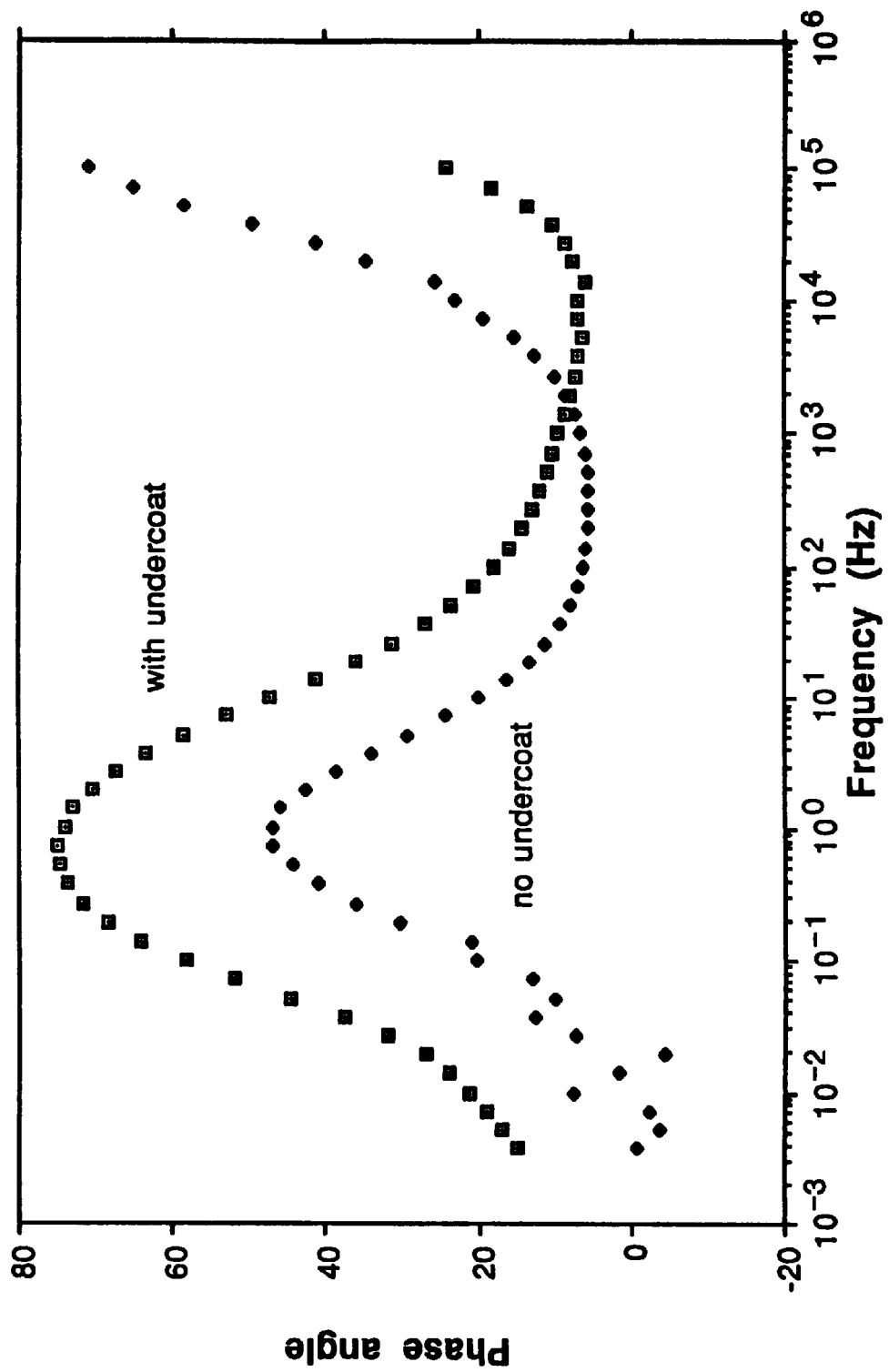
FIG. 11 is an electrochemical impedance spectroscopy scan of topcoated (epoxy) samples of AL 7075-T6 with and without electroactive undercoat.

FIG. 9 shows the result of potentiodynamic scan of a control sample that has a white epoxy (25 μm) coating on bare aluminum in 0.5 N sodium chloride. This shows the corrosion resistance of a typical barrier type epoxy polymer coating. A comparative sample that contains aluminum substrate, 2 μm thick polyaniline:poly (acrylic acid-co-methylacrylate) with the same thickness of spray painted epoxy (25 μm) was also tested under the same condition. The corrosion current was so small in the electroactive polymer undercoated sample that it was below the limit of the potentiostat instrument capability (EG&G, Princeton Applied research Model 273 Potentiostat/Galvanostat) so that the potentiodyanic scan could not be shown. We then resorted to long term testing in the 0.5 N sodium chloride solution with the technique of Electrochemical Impedance Spectroscopy (EIS). The comparative test results are shown in FIGS. 10 and 11 for samples (same coating thicknesses) immersed in chloride solution for two weeks. The EIS results showed that the epoxy coating on aluminum with electroactive polymer undercoat is more effective than the epoxy coating without the electroactive undercoat. The magnitude of the electrochemical impedance of the electroactive undercoated epoxy is one order of magnitude higher than the control sample that has the same epoxy coating on aluminum.

EXAMPLE IV

The electroactive polymers of examples 1 and 2 were blended with commercial epoxy to form an adhesive blend was then applied to aluminum and steel surfaces an anti-corrosion coatings.

In this example, we used a commercial clear, two-part epoxy. The two parts were (1) epoxy polymer and (2) hardener which contains difunctional amines. The hardener was mixed with the conductive polymer, 80/20% by weight hardener/polymer. The conductive polymer may be mixed with the hardener in the range of 10 to 40% by weight. The electroactive polymers of examples 1 and 2 were mixed with the hardener to form a well mixed electroactive hardener. The electroactive hardener was then mixed with the epoxy before applying to the metal surface. The electroactive epoxy is effective as an undercoat, a primer or a single coat.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. An anti-corrosive polymeric complex which comprises:

a plurality of double stranded molecular complexes, each of the molecular complexes comprising a strand of a conductive polymer selected from the group consisting of polyaniline, polypyrrole, polythiophene, poly (phenylene sulfide), poly(p-phenylene), poly (phenylene vinylene), poly (furylene vinylene), poly (carbazole), poly(thienylene vinylene), polyacetylene, and poly(isothianaphthene), and a strand of a copolymer, the copolymer selected from the group consisting of poly(acrylic acid-co-methylacrylate), poly(acrylic acid-co-ethylacrylate), poly(acrylic acid-co-acrylamide), poly(acrylic acid-co-methylvinylether) and poly(acrylic acid-co-ethylvinylether), the strands of the polymeric complex being non-covalently bonded to each other along the contour of the strands to form a side by side, twisted, double stranded configuration, the polymeric complex being organic solvent soluble.

2. A coating system which comprises:

the polymeric complex of claim 1 coated on a substrate selected from the group consisting of aluminum and steel.

3. A coating composition which comprises the polymeric complex of claim 1 blended with a material selected from the group consisting of epoxies, polyurethanes, polyamides, polyimides, polyaramids, polyacrylates, poly(vinyl alcohol), poly(ethylene), polypropylene, poly(acrylic acid-co-ethylene), or poly(acrylic acid-co-propylene).

4. A coating material which comprises:

the polymeric complex of claim 1 coated on a substrate selected from the group consisting of aluminum and steel;

a coating over the polymeric complex selected from the group consisting of epoxies, polyurethanes, polyamides, polyimides, polyaramids, polyacrylates, poly(vinyl alcohol), poly(ethylene), polypropylene, poly(acrylic acid-co-ethylene), or poly(acrylic acid-co-propylene).

* * * * *